(12) United States Patent
Zhang et al.

(10) Patent No.: US 10,114,728 B2
(45) Date of Patent: Oct. 30, 2018

(54) DYNAMIC FUNCTION-LEVEL HARDWARE PERFORMANCE PROFILING FOR APPLICATION PERFORMANCE ANALYSIS

(71) Applicant: NEC Laboratories America, Inc., Princeton, NJ (US)

(72) Inventors: Hui Zhang, Princeton Junction, NJ (US); Nipun Arora, Plainsboro, NJ (US); Junghwan Rhee, Princeton, NJ (US); Kai Ma, Princeton, NJ (US); Guofei Jiang, Princeton, NJ (US)

(73) Assignee: NEC Corporation (JP)

( * ) Notice: Subject to any disclaimer, the term of this patent is extended or adjusted under 35 U.S.C. 154(b) by 268 days.

(21) Appl. No.: 14/250,340

(22) Filed: Apr. 10, 2014

(65) Prior Publication Data

US 2014/0310561 A1 Oct. 16, 2014

Related U.S. Application Data

(60) Provisional application No. 61/810,811, filed on Apr. 11, 2013.

(51) Int. Cl.
*G06F 11/36* (2006.01)

(52) U.S. Cl.
CPC .................. *G06F 11/3636* (2013.01)

(58) Field of Classification Search
CPC .................................................. G06F 11/3636
USPC ........................................................ 717/158
See application file for complete search history.

(56) References Cited

U.S. PATENT DOCUMENTS

| | | | |
|---|---|---|---|
| 8,230,059 B1 * | 7/2012 | Santos | G06F 11/301 709/224 |
| 8,365,187 B2 * | 1/2013 | Paul | G06F 9/30076 718/100 |
| 2006/0020918 A1 * | 1/2006 | Mosberger | G06F 11/3409 717/124 |
| 2006/0230391 A1 * | 10/2006 | Alexander, III | G06F 11/3616 717/130 |
| 2009/0063393 A1 * | 3/2009 | Saake | G06F 17/30073 |
| 2010/0023926 A1 * | 1/2010 | Sugawara | G06F 8/75 717/120 |
| 2011/0087927 A1 * | 4/2011 | Arnold | G06F 11/366 714/38.1 |
| 2012/0324292 A1 * | 12/2012 | Bhat | G06F 11/3466 714/38.1 |
| 2013/0018776 A1 * | 1/2013 | Xie | G06Q 40/02 705/38 |

* cited by examiner

*Primary Examiner* — Li B. Zhen
*Assistant Examiner* — Bradford F Wheaton
(74) *Attorney, Agent, or Firm* — Joseph Kolodka

(57) ABSTRACT

The invention is directed to a computer implemented method and a system that implements an application performance profiler with hardware performance event information. The profiler provides dynamic tracing of application programs, and offers fine-grained hardware performance event profiling at function levels. To control the perturbation on target applications, the profiler also includes a control mechanism to constraint the function profiling overhead within a budget configured by users.

14 Claims, 4 Drawing Sheets

(a) shared control data structure: an example (b) shared data table: an example

DYNAMIC FUNCTION-LEVEL HARDWARE PERFORMANCE PROFILING FOR APPLICATION PERFORMANCE ANALYSIS

RELATED APPLICATION INFORMATION

This application claims priority to provisional application No. 61/810,811 filed Apr. 11, 2013, the contents thereof are incorporated herein by reference

BACKGROUND OF THE INVENTION

The present invention relates generally to software system performance diagnosis, and more particularly, to dynamic function level hardware performance profiling for application performance analysis.

In computer systems, hardware counters provide low-overhead access to a wealth of detailed performance information related to CPU's functional units, caches and main memory etc. The current off-the-shelf profilers featuring hardware events statistics are usually used for off-field analysis. They either collect as much information as possible in one execution (e.g., OProfile [oprofile]) with a large execution time overhead or require multiple runs to gradually localize root cause (e.g. Intel VTune[vtune]). In both cases, performance profiling is done for the complete trial runs, [oprofile] John Levon and Philippe Elie, OProfile: A system profiler for Linux, 2011, [vtune] Intel, VTune Amplifier, 2011.

For complex applications and long-running service programs, many performance bugs are the results of certain workload pressure or very specific input combination, and may render themselves only on certain production hardware specifications or system configurations. They are difficult to reproduce. Therefore, a run-time tracing tool is highly desirable. We list the features of such a tool as follows:

Enabling and disabling the tracing of hardware performance events and their association with function calls at any time during the execution of a target application.
Introducing low and controllable overhead.
Utilizing limited number of hardware performance counters to provide function-level and thread-aware hardware statistics.

The current off-the-shelf profilers with hardware statistics such as OProfile and VTune [oprofile, vtune] are effective to inspect code execution. However, they do not consider the overhead of hardware statistics collection, which actually takes a lot of CPU cycles. Moreover, the hardware events information is system-wide without fine-grained tracing such as tracing each function. Lastly, they do not support run-time performance profiling for long-running service programs.

Accordingly, there is a need for a solution for guarding a monitoring scope and interpreting partial control flow context that is not taught hereto before.

BRIEF SUMMARY OF THE INVENTION

The invention is directed to a system with a computer implementation of performance profiling for performance analysis, the system includes an application instrumentation for inserting probe points into a target application program so that at run-time, performance profiling can be done by enabling those probe points, an application dynamic tracing, with selected targets and overhead budget, for profiling the target application performance during its execution, and a performance data analyzer for analyzing the application performance data output by the application dynamic tracing, wherein the application instrumentation, application dynamic tracing and performance data analyzer cooperate to enable dynamic function-level hardware performance profiling for application performance analysis.

In a similar aspect of the invention, there is provided a computer implemented method for performance profiling to analyze application performance, the method includes inserting probe points into a target application program so that at run-time performance profiling can be done by enabling those probe points, profiling the target application performance during its execution with selected targets and overhead budget, and analyzing the application performance data output by the application dynamic tracing, wherein the inserting, profiling and analyzing enable dynamic function-level hardware performance profiling for application performance analysis.

These and other advantages of the invention will be apparent to those of ordinary skill in the art by reference to the following detailed description and the accompanying drawings.

DETAILED DESCRIPTION

The present invention is directed to a method and a system that implements an application performance profiler with hardware performance event information. The profiler provides dynamic tracing of application programs, and offers fine-grained hardware performance event profiling at function levels. To control the perturbation on target applications, the profiler also includes a control mechanism to constraint the function profiling overhead within a budget configured by users.

Figures 1, 3:
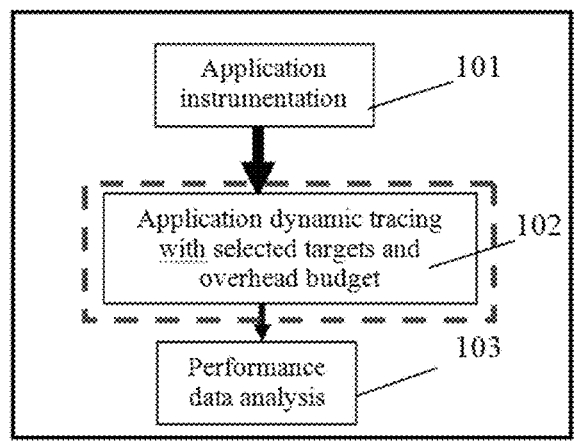
FIG. 1 is a diagram of a function performance FPerf application performance profiling process, n accordance with the invention.
FIG. 3 shows shared control data structure and shared data table examples, in accordance with the invention.

FIG. 1 shows the process of the invention, function performance FPerf run-time application performance profiling. The flow chart is explained in details as follows:

The block component 101 is an application instrumentation feature that inserts probe points into the target application program so that at run-time, performance profiling can be done by enabling those probe points. One probe point can be an instruction or a line of code that executes one profiling task, or jumps into a logging function which executes complex profiling tasks. There are many tools to support either source code instrumentation or binary instrumentation, and they may apply for FPerf usage, in our prototype, we adopt the technology disclosed in U.S. patent application Ser. No. 14/168,375, "Method and Apparatus for Computer Assisted Hot-Tracing Mechanism" which uses compiler flags to introduce probe points in the program executable at compilation time. The probe points are either at the beginning or ending of an application function, and can be enabled or disabled at run-time with the technology filed U.S. application Ser. No. 14/168,375.

The block component 102 is application dynamic tracing, with selected targets and overhead budget, that profiles the target application performance during its execution. The profiling can start at the beginning of the application execution, or at a later time on demand of either a user or an external process (e.g., an anomaly detection agent process); the profiling ends after a specified time interval or until the termination of the target application execution. The profiling scope is specified by an input of selected targets including the interested hardware performance events and the interested application functions, and the profiling overhead budget is specified by an input of target overhead limit (e.g., number of profiled function calls per second). The output of this step is the application performance data during the profiling time window, and the performance data includes a breakdown of the selected hardware performance events on the selected application functions.

The block component 103 is a performance data analysis. This feature analyzes the application performance data output by 102. One analysis method is ranking the selected application functions by event numbers for each selected hardware performance event, and identifying the top functions with their event numbers higher than a threshold as possibly bottlenecked, with that hardware performance event as root cause indicator. Other analysis methods can be applied as well.

Figure 2:
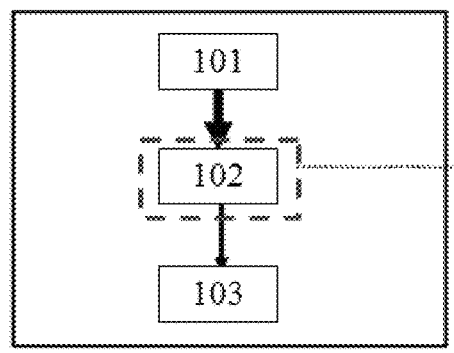
FIG. 2 is a diagram a FPerf application performance profiling procedure, in accordance with the invention.
Figure 2:
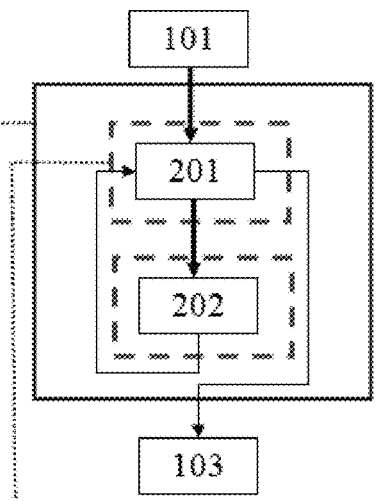
Figure 2:
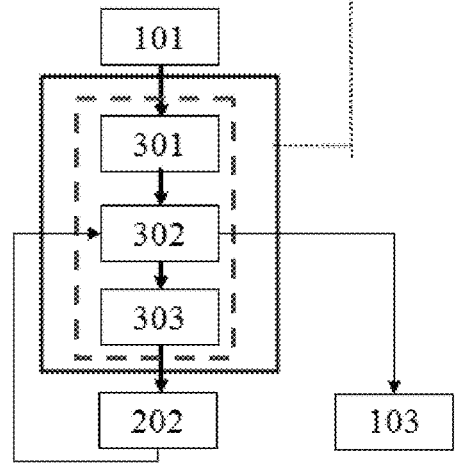

The inventive aspects are in the Application dynamic tracing with selected targets and overhead budget component 102 are further detailed in FIG. 2 which shows components 201, 202 of the function performance FPerf application performance profiling procedure.

The block component 201 is a profiling coordination. This feature runs in a daemon process independent of the target application processes. It takes input of selected targets and overhead budget, initializes a shared control data structure, decides the allocation of overhead budget among the profiling targets periodically, and logs the profiling information stored in a shared data table periodically.

The block component 202 is a function tracing. This feature runs in the target application processes/threads through the probe points instrumented in 101. When the target application runs into an enabled probe point in an application function, it jumps into a FPerf tracing function where a decision is made based on the allocated overhead budget that either returns immediately, or the selected hardware performance events are profiled through accessing hardware performance counters and updated in the shared data table.

The function performance FPerf profiling coordination procedure runs in a daemon process independent of the target application processes. FIG. 2 also shows the details of this feature as follows:

The block component 301 takes external input and initializes a shared control data structure and a shared data table. The daemon process takes external inputs from either a user or an external process (e.g., an anomaly detection agent process); the inputs include but are not limited to the profiling duration, a set of interested hardware performance events and interested application functions, and the profiling overhead budget (e.g., number of profiled function calls per second).

The daemon process initializes and maintains a shared control data structure, FIG. 3 (*a*) as an example, which includes the following attributes:

Start/stop—a Boolean variable which indicates whether the profiling procedure is active (1) or stops (0).

Overhead quota—an integer variable which records the total overhead quota in a budget allocation time window. The quota can be but is not limited to number of profiled function calls.

Allocation frequency—an integer variable which specifies the budget allocation time window size (e.g., 500 ms).

Logging frequency—an integer variable which specifies the frequency of logging the shared data table content (e.g., every 1000 ms).

Data table size—an integer variable which records the shared data table size in number of rows, Active threads—an integer variable which records the active processes and threads of the target application, Selected functions—an integer variable which records the number of selected application functions for profiling.

Selected hardware events—a list which records the set of hardware performance events for profiling.

The daemon process initializes and maintains a shared data table. FIG. 3 (*b*) as an example, which includes the following attributes for each row:

Thread ID—an integer variable which records the ID of the thread/process this table row belongs to.

Function ID—an integer variable which records the ID of the application function this table row belongs to. The function ID can be assigned based on the function name, the function address in the binary, or other unique attribute of the function.

Profiling quota—an integer variable which records the profiling overhead quota allocated to this function. The quota can be but is not limited to number of profiled function calls.

Function calls—an integer variable which records the number of calls made on this function.

Function time—an integer variable which records the time spent on this function.

Hardware event ID—an integer variable which records the ID of the hardware performance event.

Profiling decision—a Boolean variable which records the selection decision on the hardware event: selected (true) or not selected (false).

Event value—an integer variable which records the accumulated event number of the hardware event.

The block component 302 periodically logs profiling information. Based on the logging frequency setting in the shared control data structure, the daemon process periodically logs the shared data table content onto a performance data file; the file can reside in the memory or at a local disk.

The block component 303 periodically updates overhead budget allocation. Based on the allocation frequency setting in the shared control data structure, the daemon process periodically resets the profiling quota for each active function in the shared data table. The budget allocation scheme can be a simple algorithm dividing the total budget quota equally among all selected functions, or more complex algorithms based on the quota usage history such as the leaky bucket algorithms.

Figure 4:
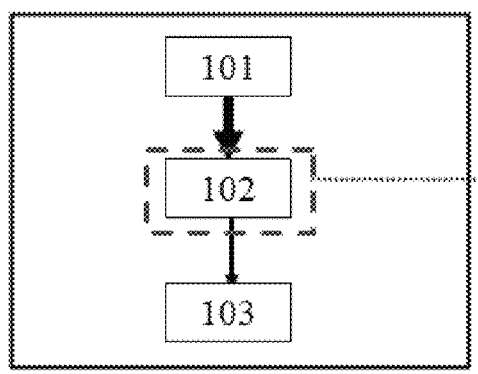
FIG. 4 is a diagram of a FPeef application function tracing procedure, in accordance with the invention.
Figure 4:
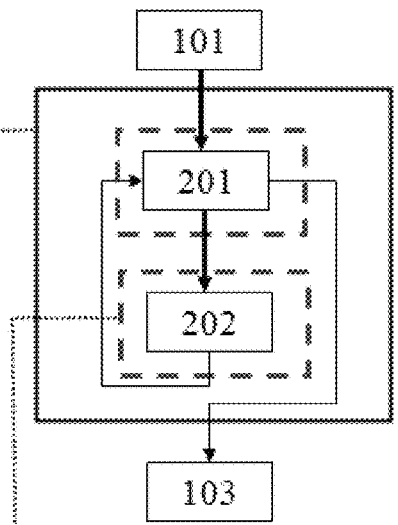
Figure 4:
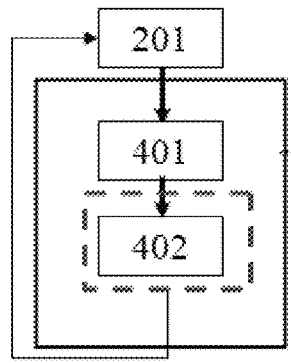

The FPerf function tracing procedure runs in the target application processes/threads through the probe points instrumented in 101. When the target application runs into an enabled probe point in an application function, it jumps into a FPerf tracing function where a decision is made based on the allocated overhead budget that either returns immediately, or the selected hardware performance events are profiled through accessing hardware performance counters and updated in the shared data table. FIG. 4 also shows the details of this procedure as follows:

Enables/disables probe points for the selected functions 401. An external process controls the status of the instrumented probe points, enables or disables the set of probe points related to the selected application functions in the run time. There are many ways to implement this hot tracing functionality. In our prototype, we adopt the technology disclosed in U.S. patent application Ser. No. 14/168,375, "Method and Apparatus for Computer Assisted Hot-Tracing Mechanism".

The block component 402 runs the FPerf tracing function in a probe point. When the target application runs into an enabled probe point in an application function, it jumps into a FPerf tracing function which runs the following steps:

a. Generates the index to the shared data table using the process/thread ID and the function ID.
b. Checks the corresponding shared data table row, if the "profiling quota" attribute has its value below 0, go to 402.e.
c. if the probe point is for the beginning of the application function, uses the available hardware performance counters to read the current values of the selected hardware performance events, and store those as "beginning values". Existing tools such as PAPI (Performance Application Programming Interface) provides the thread-aware reading of those hardware performance event values. Also, records the current time as "beginning time".
d. if the probe point is for the ending of the application function, uses the available hardware performance counters to read the current values of the selected hardware performance events, subtract them by the corresponding "beginning values" stored earlier for the same function of the same thread, update the "event value" attribute for each selected hardware event with the calculated value. Existing tools such as PAPI (Performance Application Programming Interface) provides the thread-aware reading of those hardware performance event values. Also, updates the "function time" attribute for the function after subtracting the current time by the stored "beginning time" stored earlier for the same function of the same thread. Also, updates the "function calls" attribute for the function by incrementing its value by 1.
e. updates the "profiling quota" attribute by decreasing its value by 1; return.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device. More details are discussed in U.S. Pat. No. 8,380,557, the content of which is incorporated by reference.

Figure 5:
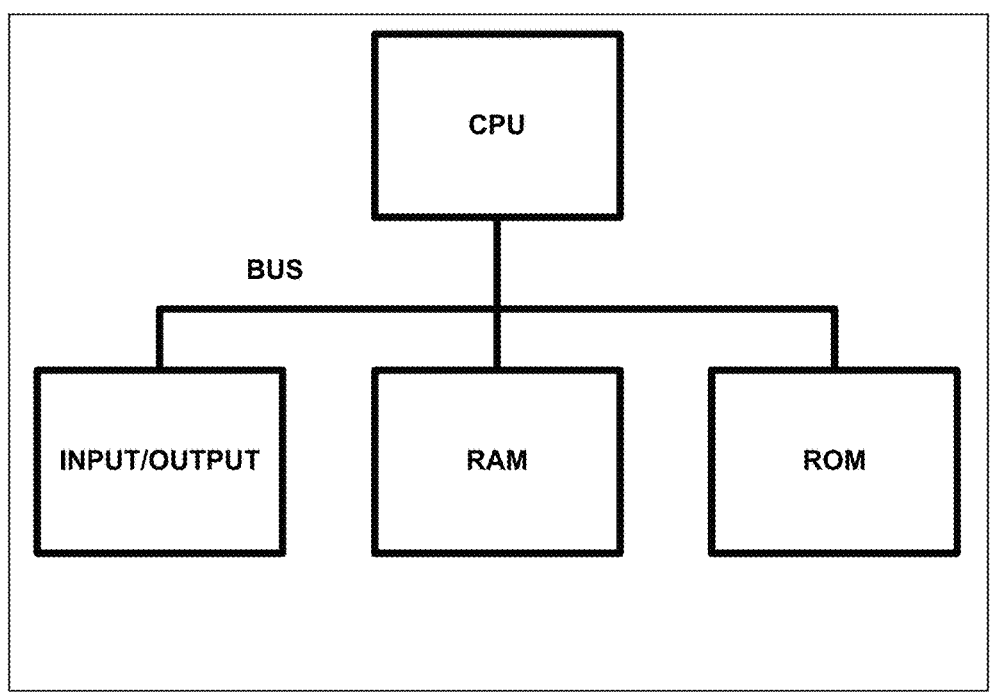
FIG. 5 shows an exemplary computer to perform the inventive database cloud bursting.

By way of example, a block diagram of a computer to support the system is discussed next in FIG. 5. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

From the foregoing, it can be appreciated that the present invention provides higher quality for application performance analysis by providing detailed hardware performance information for accurate root cause localization within application functions. Additionally, the present invention introduces lower overhead than off-the-shelf profiler like Intel vTune by allowing user enabling/disabling the profiling process at any time on any subset of application functions and any subset of hardware performance events. This enables monitoring long-time running services in production systems.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A system with a computer implementation of performance profiling for performance analysis, the system comprising:
   a processor coupled to a non-transitory computer-readable storage medium, the processor being configured for:
   inserting probe points, using an application instrumentation, into a target application program so that at run-time, performance profiling can be done by enabling those probe points;
   profiling, using an application dynamic tracing, with selected targets and overhead budget, the target application performance during its execution; and
   analyzing, using a performance data analyzer, the application performance data output by the application dynamic tracing;
   wherein the application instrumentation, application dynamic tracing and performance data analyzer are configured to cooperate to selectively enable and disable dynamic function-level hardware performance profiling of hardware performance events and association of the hardware performance events with function calls for application performance analysis at a plurality of times on any subset of application functions and any subset of the hardware performance events;

wherein a profiling scope is specified by inputting the selected targets and the profiling is configured to begin upon execution of the target application or on demand by a user or an external process at any selected time during the execution of the target application, the selected targets including interested hardware performance events and interested application functions;

wherein the overhead budget is specified by a target overhead limit;

wherein the profiling ends after a specified time interval or upon termination of the target application;

wherein the application dynamic tracing comprises a function tracing for running the target application processes and threads through the probe points of the application instrumentation;

wherein the tracing function generates an index to a shared data table using a process or thread identification and a function identification; and wherein the tracing function, if the probe point is for a beginning of the application function, uses available hardware performance counters to read current values of selected hardware performance events, and stores those values, and wherein the tracing function, if the probe point is for an ending of the application function, uses available hardware performance counters to read current values of selected hardware performance events, subtracting them by corresponding beginning values stored earlier for the same function of the same thread, and updating an event value attribute for each selected hardware event with a calculated value.

2. The system of claim 1, wherein the application dynamic tracing comprises a profiling coordination for running a daemon process independent of the target application process.

3. The system of claim 2, wherein the profiling coordination comprises taking an external input and initializing a shared control data structure and a shared data table.

4. The system of claim 3, wherein the profiling coordination comprises, based on a logging frequency setting in the shared control data structure and a shared data table.

5. The system of claim 3, wherein the profiling coordination comprises, based on an allocation frequency setting in the shared control data structure, a daemon process periodically resetting a profiling quota for each active function in the shared data table enabling periodic updating of overhead budget allocation.

6. The system of claim 1, wherein the function tracing profiling coordination comprises taking an external input and initializing a shared control data structure and a shared data table.

7. The system of claim 1, wherein the function tracing comprises running the tracing function in a probe point, including that when a target application runs into an enabled probe point in an application function, the target application jumps into the tracing function.

8. A computer implemented method for performance profiling to analyze application performance, the method comprising the steps of:
i) inserting probe points into a target application program so that at run-time performance profiling can be done by enabling those probe points;
ii) profiling the target application performance during its execution with selected targets and overhead budget; and iii) analyzing the application performance data output by the application dynamic tracing;

wherein a profiling scope is specified by inputting the selected targets, the selected targets including interested hardware performance events and interested application functions;

wherein the overhead budget is specified by a target overhead limit;

wherein the profiling is configured to begin upon execution of the target application or on demand by a user or an external process at any selected time during the execution of the target application, and the profiling ends after a specified time interval or upon termination of the target application;

wherein steps i)-iii) cooperatively provide a platform for selectively enabling and disabling dynamic function-level hardware performance profiling of hardware performance events and association of the hardware performance events with function calls for application performance analysis at a plurality of times on any subset of application functions and any subset of the hardware performance events;

wherein step ii) comprises a function tracing for running the target application processes and threads through the probe points of the application instrumentation;

wherein the tracing function generates an index to a shared data table using a process or thread identification and a function identification; and wherein the tracing function, if the probe point is for a beginning of the application function, uses available hardware performance counters to read current values of selected hardware performance events, and stores those values, and wherein the tracing function, if the probe point is for an ending of the application function, uses available hardware performance counters to read current values of selected hardware performance events, subtracting them by corresponding beginning values stored earlier for the same function of the same thread, and updating an event value attribute for each selected hardware event with a calculated value.

9. The method of claim 8, wherein step ii) comprises a profiling coordination for running a daemon process independent of the target application process.

10. The method of claim 9, wherein the profiling coordination comprise taking an external input and initializing a shared control data structure and a shared data table.

11. The method of claim 10, wherein the profiling coordination comprises, based on a logging frequency setting in the shared control data, a daemon process periodically logs the shared data table content onto a performance file.

12. The method of claim 10, wherein the profiling coordination comprises, based on an allocation frequency setting in the shared control data structure, a daemon process periodically resetting a profiling quota for each active function in the shared data table enabling periodic updating of overhead budget allocation.

13. The method of claim 8, wherein the function tracing comprises running the racing function in a probe point, including that when a target application runs into an enabled probe point in an application function, the target application jumps into the tracing function.

14. The method of claim 8, wherein the function tracing comprises running the racing function in a probe point, including that when a target application runs into an enabled probe point in an application function, the target application jumps into the tracing function.

* * * * *